United States Patent
Vaystikh et al.

(10) Patent No.: US 8,875,244 B1
(45) Date of Patent: *Oct. 28, 2014

(54) METHOD AND APPARATUS FOR AUTHENTICATING A USER USING DYNAMIC CLIENT-SIDE STORAGE VALUES

(75) Inventors: Alex Vaystikh, Hod Hasharon (IL); Oleg Freylafert, Hod Hasharon (IL)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/077,076

(22) Filed: Mar. 31, 2011

(51) Int. Cl.
| | | |
|---|---|---|
| *G06F 7/04* | (2006.01) | |
| *G06F 17/30* | (2006.01) | |
| *H04L 29/06* | (2006.01) | |
| *G06F 15/173* | (2006.01) | |
| *G06F 21/00* | (2013.01) | |
| *H04L 9/32* | (2006.01) | |

(52) U.S. Cl.
CPC .......... *H04L 9/3228* (2013.01); *H04L 63/0876* (2013.01); *H04L 9/3226* (2013.01); *H04L 63/08* (2013.01)
USPC .............. 726/4; 726/2; 726/3; 726/5; 726/21; 709/225; 713/182

(58) Field of Classification Search
CPC ....... H04L 9/32; H04L 9/3226; H04L 9/3228; H04L 63/08; H04L 63/10; H04L 63/102; H04L 63/0815; H04L 63/0838; H04L 63/0876; H04L 63/0846; G06F 21/31; G06F 21/46; G06F 21/316; G06F 21/6263; G06F 2221/2129
USPC .................. 726/2–10; 713/168–173
See application file for complete search history.

(56) References Cited

U.S. PATENT DOCUMENTS

| | | | |
|---|---|---|---|
| 7,562,221 | B2 | 7/2009 | Nystrom et al. |
| 8,060,750 | B2 * | 11/2011 | Duane et al. ................... 713/182 |
| 8,601,109 | B2 * | 12/2013 | Johannsen ..................... 709/223 |
| 2007/0094498 | A1 * | 4/2007 | Nystrom et al. .............. 713/168 |
| 2009/0172402 | A1 * | 7/2009 | Tran ............................... 713/170 |
| 2009/0258637 | A1 * | 10/2009 | Liu et al. ..................... 455/414.2 |
| 2010/0305989 | A1 * | 12/2010 | Mu et al. ........................... 705/7 |
| 2011/0288940 | A1 * | 11/2011 | Horadan et al. ............ 705/14.69 |
| 2011/0296038 | A1 * | 12/2011 | Mandre .......................... 709/228 |
| 2012/0215896 | A1 * | 8/2012 | Johannsen .................... 709/223 |

\* cited by examiner

*Primary Examiner* — Tae Kim
(74) *Attorney, Agent, or Firm* — Ryan, Mason & Lewis, LLP

(57) ABSTRACT

Access of a client device to a protected resource is controlled by issuing an authentication information request for a dynamic sub-set of client-side storage values previously stored on the client device by one or more servers. Authentication information is received from the client device based on the dynamic sub-set of client-side storage values. The client device is authenticated based upon verification of the received authentication information. The received authentication information from the client device is optionally encrypted. The client-side storage values comprise any value stored by one or more servers on the client device. The client-side storage values are substantially specific to the client device. The client-side storage values are optionally stored as a matrix. The requested dynamic sub-set of the client-side storage values may comprise one or more cells from a plurality of records in the matrix. The requested dynamic sub-set of the client-side storage values ensures that an authentication for two different login sessions do not request a same sub-set of the client-side storage values.

23 Claims, 3 Drawing Sheets

| | 320 | 330 | 340 | 350 | 360 | ...Z XYZ... |
|---|---|---|---|---|---|---|
| | HTTP COOKIE | FLASH SHARE OBJECT | LOCAL STORAGE | SILVERLIGHT ISOLATED STORAGE | DATABASE STORAGE | |
| #1 | Random() | Random() | Random() | Random() | Random() | Random() |
| #2 | Random() | Random() | Random() | Random() | Random() | Random() |
| #3 | Random() | Random() | Random() | Random() | Random() | Random() |
| #... | Random() | Random() | Random() | Random() | Random() | Random() |
| #n | Random() | Random() | Random() | Random() | Random() | Random() |

METHOD AND APPARATUS FOR AUTHENTICATING A USER USING DYNAMIC CLIENT-SIDE STORAGE VALUES

FIELD OF THE INVENTION

The present invention relates generally to security techniques for authenticating users over a network or in other types of communication systems.

BACKGROUND OF THE INVENTION

In order to gain access to applications or other resources via a computer or other user device, users are often required to authenticate themselves by entering authentication information. Such authentication information may comprise, for example, passwords that are generated by a security token carried by a user. These passwords may be one-time passwords that are generated using a time-synchronous or event-based algorithm. One particular example of a well-known type of security token is the RSA SecurID® user authentication token commercially available from RSA Security Inc. of Bedford, Mass., U.S.A.

Generally, such security token-based authentication techniques provide one-time authentication at the beginning of a session to verify a user (often referred to as single sign-on authentication techniques). U.S. Pat. No. 7,562,221 to Nyström et al., assigned to the assignee of the present invention and incorporated by reference herein, also discloses single sign-on authentication techniques that allow multiple accesses by a user to one or more applications or other resources.

With the increasing prevalence of wireless communications, it is easier for a hacker to listen into communication between a client and server. Hackers may take advantage of this to intercept sensitive information, such as an Authentication Cookie that is stored by the server on the client following an authentication to track the client during a session. An intercepted Authentication Cookie can allow the hacker to gain access in the future. In addition, malicious software (malware) is also a threat. Malware includes computer viruses, Trojan horses, worms and other malicious and unwanted software programs. Trojan horses, for example, can install themselves on user machines without being perceived by the user. Trojan horses may then enable a controller to record keyboard entries from an infected machine (e.g., Key Loggers), listen in on conversations (e.g., Man in The Middle or MiTB), or even hijack an HTTP session from within a browser (e.g., Man in The Browser or MiTB). In this manner, Trojan horses can secretly obtain user names and passwords, or alter transactions as they occur. Thus, the user may think he or she is performing a legitimate transaction (e.g., paying a bill) but in reality the user is sending money to another account. Trojan horses also allow session hijacking, whereby a remote fraudster performs transactions via the user's session.

Thus, improved security techniques are needed to reduce the susceptibility of a user to such malware and hacking. In addition, improved security techniques are needed that authenticate a user using information with a high specificity to the user.

SUMMARY OF THE INVENTION

The present invention in the illustrative embodiments described herein provides methods and apparatus for authenticating a user using information with a high specificity to the user, such as portions of a cookie or related tracking information that are stored for the purpose of client tracking. In accordance with an aspect of the invention, access of a client device to a protected resource is controlled by issuing an authentication information request for a dynamic sub-set of client-side storage values previously stored on the client device by one or more servers and then receiving authentication information from the client device based on the dynamic sub-set of client-side storage values. The client device is authenticated based upon verification of the received authentication information. The received authentication information from the client device is optionally encrypted.

The client-side storage values comprise any value stored by one or more servers on the client device. The client-side storage values are substantially specific to the client device. For example, one or more of the client-side storage values uniquely identify the client device.

The client-side storage values are optionally stored as a matrix having a plurality of records. Each record in the matrix is typically associated with a prior login session. The requested dynamic sub-set of the client-side storage values may comprise one or more cells from a plurality of the records. According to a further aspect of the invention, the selected dynamic sub-set of the client-side storage values ensures that an authentication for two different login sessions do not request a same sub-set of the client-side storage values.

The authentication techniques of the illustrative embodiments overcome one or more of the problems associated with the conventional techniques described previously, and permit users to authenticate themselves using a dynamic sub-set of client-side storage values that are already stored on the client device. Moreover, no modification of the applications or communication protocols is required. These and other features and advantages of the present invention will become more readily apparent from the accompanying drawings and the following detailed description.

DETAILED DESCRIPTION

The present invention provides improved security techniques to reduce the susceptibility of a user to malware and hacking. Advertising cookies and related tracking information are generally stored by one or more servers on a client device for the purpose of uniquely tracking the computer activities of a user. The present invention recognizes that the cookies and related client-side storage values have a high specificity to the user. According to one aspect of the invention, a user is authenticated using portions of such client-side storage values that have a high specificity to the user. The present invention will be described herein with reference to an exemplary communication system in which a user device, referred to herein as a client-side computing device, communicates with an authentication authority and one or more additional entities, such as a protected resource. It is to be appreciated, however, that the invention is not restricted to use in this or any other particular system configuration. As used herein, the term "client-side storage values" shall mean any value stored by one or more servers on a client-side computing device.

Figure 1:
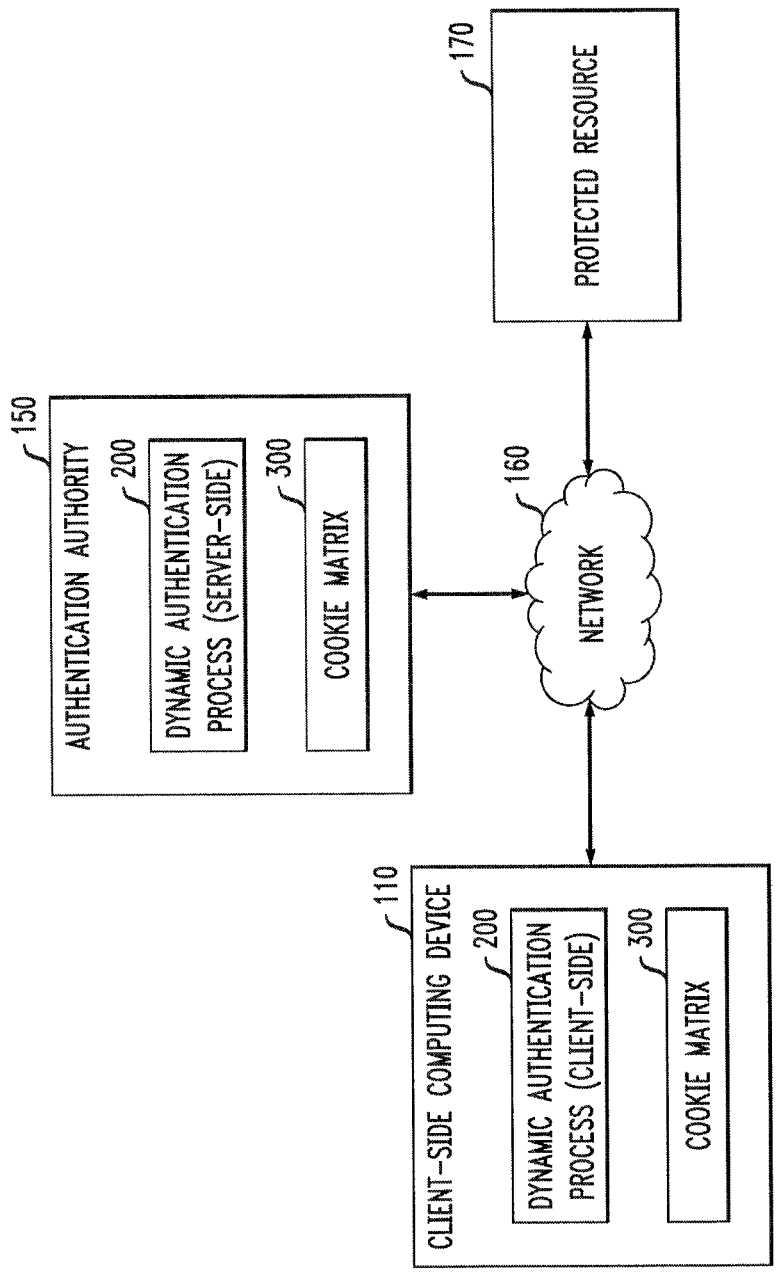
FIG. 1 illustrates an exemplary network environment in which the present invention can operate.

FIG. 1 illustrates an exemplary client-side computing device (CSCD) 110 communicating with a protected resource 170 over a network 160. In an exemplary implementation, the user may optionally authenticate with an authentication authority 150 using, for example, a token generated by a security token generator (not shown) before obtaining access to the protected resource 170. The network 160, may comprise, for example, a global computer network such as the Internet, a wide area network (WAN), a local area network (LAN), a satellite network, a telephone or cable network, or various portions or combinations of these and other types of networks.

It is to be appreciated that a given embodiment of the disclosed system may include multiple instances of CSCD 110, authentication authority 150 and protected resource 170, and possibly other system components, although only single instances of such components are shown in the simplified system diagram of FIG. 1 for clarity of illustration.

The CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, a wired telephone, a television set top box, or any other information processing device which can benefit from the use of authentication techniques in accordance with the invention.

The CSCD 110 may also be referred to herein as simply a "user." The term "user" should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password or other authentication information described as being associated with a user may, for example, be associated with a CSCD device 110, a person utilizing or otherwise associated with the device, or a combination of both the person and the device.

As shown in FIG. 1, the exemplary CSCD 110 comprises a client-side dynamic authentication process 200, discussed further below in conjunction with FIG. 2, and a client-side storage matrix 300, discussed further below in conjunction with FIG. 3, incorporating features of the present invention.

The authentication authority 150 is typically a third party entity that processes authentication requests on behalf of web servers and other resources, and verifies the authentication information that is presented by a CSCD 110. As shown in FIG. 1, the exemplary authentication authority 150 comprises a server-side dynamic authentication process 200, discussed further below in conjunction with FIG. 2, and a client-side storage matrix 300, discussed further below in conjunction with FIG. 3, incorporating features of the present invention. The client-side storage matrix 300 stored by the authentication authority 150 is a copy of the client-side storage matrix 300 stored by the CSCD 110 and allows the authentication authority 150 to verify the authentication information provided by the CSCD 110 that is based on the client-side storage matrix 300.

The protected resource 170 may be, for example, an access-controlled application, web site or hardware device. In other words, a protected resource 170 is a resource that grants user access responsive to an authentication process, as will be described in greater detail below. The protected resource 170 may be, for example, a remote application server such as a web site or other software program or hardware device that is accessed by the CSCD 110 over a network 160.

Figure 2:
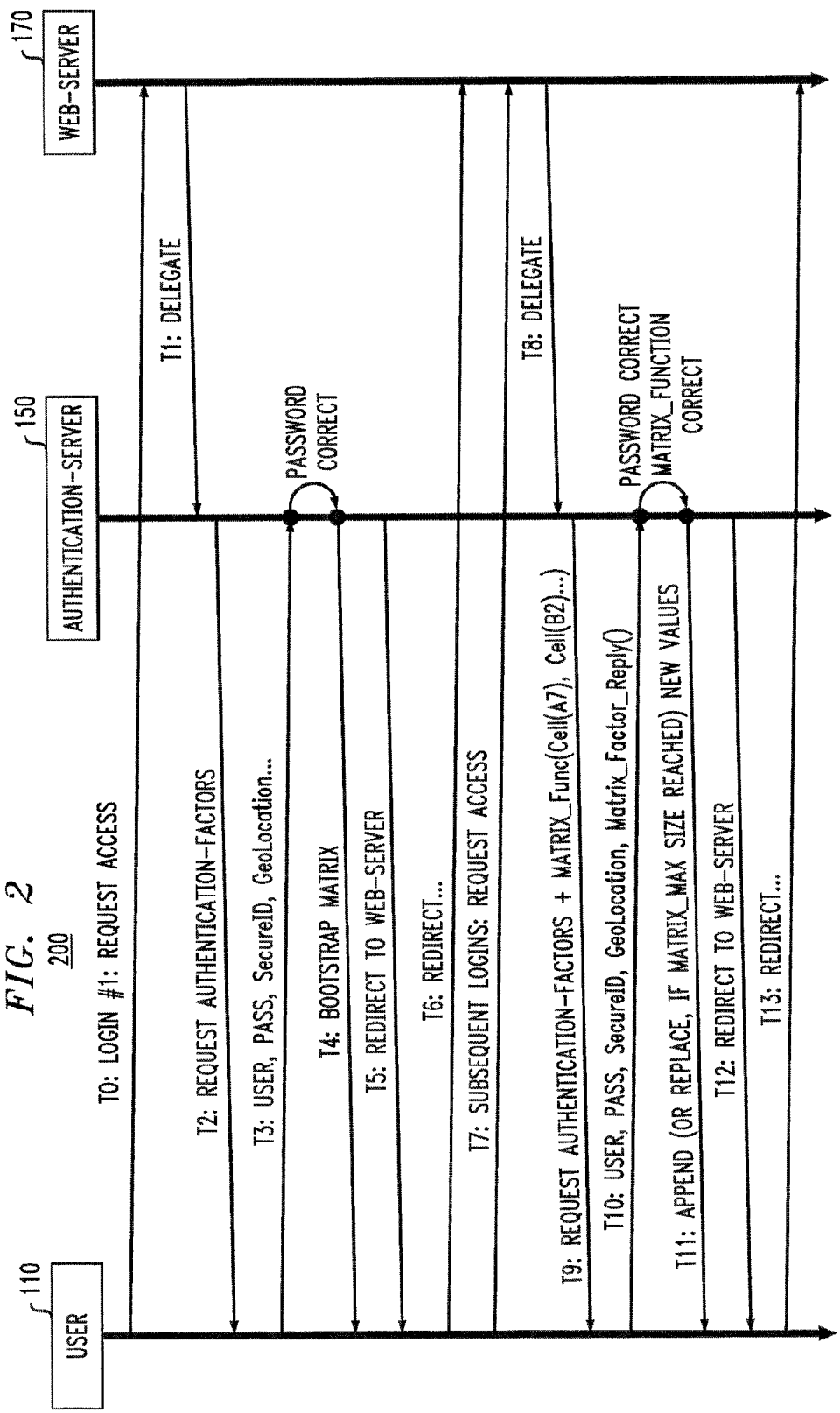
FIG. 2 illustrates an exemplary dynamic authentication process incorporating features of the present invention.

FIG. 2 illustrates communications among various system elements 110, 150 and 170 of FIG. 1 at particular points in time, denoted T0 through T13, for an exemplary dynamic authentication process 200 incorporating features of the present invention. As shown in FIG. 2, at a time T0, the user requests access to the protected resource 170 as part of a first login attempt to the protected resource 170. Thereafter, at a time T1, the protected resource 170 delegates processing of the login to the authentication authority 150. In one variation, the protected resource 170 can directly request authentication information from the CSCD 110 without delegating the authentication to the authentication authority 150.

At a time T2, the authentication authority 150 requests predefined authentication factors from the CSCD 110. For example, the authentication authority 150 can present a web page to the user with fields to be populated by the user for a username, password and/or a dynamic factor, such as a SecureID tokencode, in a known manner. In addition, the authentication factor request can include a script to optionally collect a geographic location identifier of the user (geolocation).

At a time T3, the requested authentication factors (such as username, password, secureID, and geolocation) are returned by the CSCD 110 to the authentication authority 150. If the authentication authority 150 determines that the returned password authentication factors are correct, an exemplary bootstrap matrix is sent to the CSCD 110 at a time T4, to provide an initial entry for the client-side storage matrix 300 of the CSCD 110. The exemplary bootstrap matrix may contain, for example, an entry having one or more values for the client-side storage matrix 300. Thereafter, at a time T5, a redirect message is sent by the authentication authority 150 to the CSCD 110 to redirect the CSCD 110 to the protected resource 170, such as a web server. At a time T6, the CSCD 110 redirects to the protected resource 170 for further communications during the first session.

At a time T7, the user requests access to the protected resource 170 as part of a subsequent login attempt to the protected resource 170. Thereafter, at a time T8, the protected resource 170 delegates processing of the login to the authentication authority 150.

At a time T9, the authentication authority 150 requests predefined authentication factors and a matrix function from the CSCD 110. For example, the requested predefined authentication factors can be similar to the predefined authentication factors requested at time T2. In addition, as discussed further below in conjunction with FIG. 3, the T9 request identifies portions of the client-side storage matrix 300 stored by the CSCD 110 that should be encrypted and returned to the authentication authority 150. For example, the T9 request can specify a matrix function be applied to an identified plurality of cells in the client-side storage matrix 300 (such as Cell (A7), Cell(B2), . . . ). As discussed further below, the identified cells should preferably vary for each login attempt. The applied matrix function can be, for example, a one-way hash sum operation, such as a Secure Hash Algorithm Version 1.0 (SHA1) or a Message Digest 5 (MD5) Algorithm.

At a time T10, the requested authentication factors (such as username, password, secureID, and geolocation) and matrix factor reply are returned by the CSCD 110 to the authentication authority 150. As previously indicated, the authentication authority 150 stores a representation of the client-side storage matrix 300 stored by the CSCD 110 and can compare the matrix factor reply to the expected response.

If the authentication authority 150 determines that the returned password authentication factors and matrix factor reply are correct, the client-side storage matrix 300 stored by the CSCD 110 is appended with a new record containing new values, at a time T11 (or a record can be replaced, if a predefined maximum size has been reached).

Thereafter, at a time T12, a redirect message is sent by the authentication authority 150 to the CSCD 110 to redirect the CSCD 110 to the protected resource 170, such as a web server. At a time T13, the CSCD 110 redirects to the protected resource 170 for further communications during the session.

Figures 3, 4:
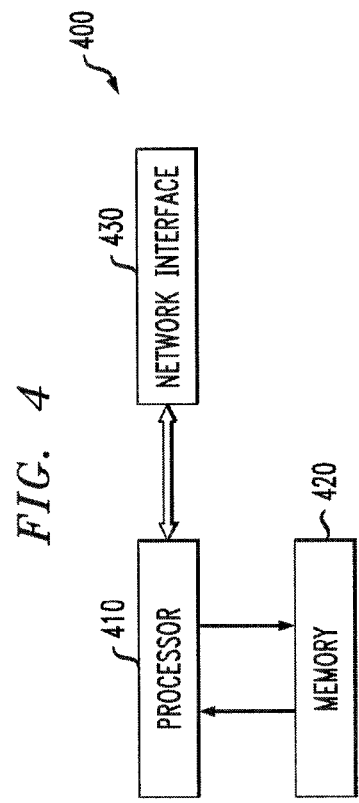
FIG. 3 is a sample table illustrating an exemplary client-side storage matrix incorporating features of the present invention.
FIG. 4 illustrates one possible implementation of a given client-side computing device, authentication authority, protected resource or another processing device of the exemplary network environment of FIG. 1.

FIG. 3 is a sample table illustrating an exemplary client-side storage matrix 300 incorporating features of the present invention. As previously indicated, "client-side storage values" shall mean any value stored by one or more servers on a client-side computing device. The exemplary embodiment employs a matrix implementation, shown in FIG. 3, for storing the client-side storage values, for ease of illustration. It is expressly noted, however, that the client-side storage values can be stored on the CSCD 110 in any format.

In the illustrative matrix embodiment of FIG. 3, the exemplary client-side storage matrix 300 comprises a plurality of records, each associated with CSCD 110. For each record, identified by a login identifier, the exemplary client-side storage client-side storage matrix 300 stores a HTTP cookie in field 320, a Flash Shared Object in field 330, a local storage element in field 340, a Silverlight isolated storage element in field 350, and a database storage element in field 360. These exemplary storage values are well-known to a person of ordinary skill in the art. It is expressly noted that the storage objects shown in FIG. 3 are merely illustrative of currently available client-side storage values that may be employed in accordance with the present invention to authenticate a user. Additional or fewer storage methods may be employed as they become available.

Generally, each cell in the matrix 300 will store a different secret that was generated by the authentication server and stored on the CSCD 110. Identified portions of client-side storage values from the matrix 300 can be used in accordance with the present invention to authenticate the user, as discussed above in conjunction with FIG. 2. The notation "Random( )" in FIG. 3 indicates a random value that is different from any other number in the client-side storage matrix 300.

As previously indicated, the client-side storage matrix 300 is appended with a new entry containing new values with each login session, until a predefined maximum size of the client-side storage matrix 300 has been reached (at which time, a previous record in the client-side storage matrix 300 can be replaced with a new record). Thus, each record in the exemplary client-side storage matrix 300 typically corresponds to a different login session.

Generally, the algorithm that is applied by the authentication authority 150 during the dynamic authentication process 200 (FIG. 2) to dynamically identify particular cells in the client-side storage matrix 300 that should be processed by the CSCD 110 in creating the matrix factor reply of time T10 is an intelligent partial random function that ensures that no two sessions will ask for the same collection of cells. In this manner, the collection of cells for a given login session is hard to anticipate by malware or a hacker. In addition, by dynamically selecting cells from a plurality of prior records of the client-side storage matrix 300 to authenticate for a given current session, the present invention ensures that it difficult for malware or a hacker to obtain enough of the client-side storage matrix 300 to fraudulently obtain access to the protected resource 170.

FIG. 4 shows one possible implementation of a given processing device 400 of the FIG. 1 system. The processing device 400 as shown may be viewed as representing, for example, CSCD 110, authentication authority 150 and protected resource 170. The processing device 400 in this implementation includes a processor 410 coupled to a memory 420 and a network interface 430. These device elements may be implemented in whole or in part as a conventional microprocessor, digital signal processor, application-specific integrated circuit (ASIC) or other type of circuitry, as well as portions or combinations of such circuitry elements. As will be appreciated by those skilled in the art, portions of an authentication technique in accordance with an embodiment of the invention can be implemented at least in part in the form of one or more software programs that are stored in memory 420 and executed by the corresponding processor 410. The memory 420 is also used for storing information used to perform computations or other operations associated with the disclosed authentication on techniques.

For a more detailed discussion of suitable token-based authentication techniques, see, for example, U.S. Pat. No. 7,562,221 to Nystrom et al., assigned to the assignee of the present invention and incorporated by reference herein.

As mentioned previously herein, the above-described embodiments of the invention are presented by way of illustrative example only. Numerous variations and other alternative embodiments may be used. For example, in the exemplary embodiment, the protected resource 170 delegates the authentication process to the authentication authority 150. Thus, upon requesting access to the protected resource 170, the CSCD 110 is redirected to the authentication authority 150 until the authentication information is verified. In a further variation, the protected resource 170 can directly requests authentication information from the CSCD 110 without delegating to the authentication authority 150.

In addition, the client-side storage matrix 300 has been illustrated in conjunction with FIG. 3 using an exemplary matrix implementation. "Client-side storage values" shall mean any value stored by one or more servers on a client-side computing device, in any format. In addition, the exemplary storage formats shown in FIG. 3, such as Flash Shared Objects and Silverlight isolated storage elements, are merely illustrative of currently available client-side storage values that may be employed in accordance with the present invention to authenticate a user. Additional or fewer storage methods may be employed as they become available.

Additional details regarding certain conventional cryptographic techniques referred to herein may be found in, e.g., A. J. Menezes et al., Handbook of Applied Cryptography, CRC Press, 1997, which is incorporated by reference herein.

The term "authentication information" as used herein is intended to include passwords, passcodes, answers to life questions, or other authentication credentials, or values derived from such authentication credentials, or more generally any other information that a user may be required to submit in order to obtain access to an access-controlled application. Although the illustrative embodiments are described herein in the context of passwords, it is to be appreciated that the invention is more broadly applicable to any other type of authentication information.

The illustrative embodiments of the invention as described herein provide an improved authentication of users of password-based authentication systems. Advantageously, the illustrative embodiments do not require changes to existing communication protocols. It is therefore transparent to both existing applications and communication protocols. The described techniques may be used with security tokens that generate one-time passwords or other types of authentication information, regardless of whether such tokens are connectable to the user device.

It should again be emphasized that the particular authentication techniques described above are provided by way of illustration, and should not be construed as limiting the present invention to any specific embodiment or group of embodiments. For example, as previously noted, the described embodiments may be adapted in a straightforward manner to operate with other types of credentials or authentication information, and other types of access-controlled resources. Also, the particular configuration of system elements shown in FIGS. 1 and 4, and their interactions as shown in FIG. 2, may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for controlling access of a client device to a protected resource for a current session, the method comprising the steps of:
   issuing an authentication information request responsive to an access request from the client device to access the protected resource, wherein the authentication information request identifies a dynamic sub-set of cells storing client-side storage values previously stored on the client device during at least one prior session by one or more servers, wherein said dynamic sub-set of cells is identified by a plurality of cell identifiers that dynamically change for a plurality of said authentication information requests;
   receiving authentication information for said current session based on the dynamic sub-set of cells storing client-side storage values from the client device responsive to the authentication information request; and
   authenticating the client device for said current session based upon verification of the received authentication information, wherein at least one of said steps are performed by at least one hardware device.

2. The method of claim 1, wherein the received authentication information from the client device is encrypted.

3. The method of claim 1, wherein the client-side storage values are stored as a matrix having a plurality of records, wherein each record in the matrix is associated with a prior login session.

4. The method of claim 3, wherein the dynamic sub-set of the cells storing client-side storage values comprises one or more cells from a plurality of the records.

5. The method of claim 1, wherein the dynamic sub-set of the cells storing client-side storage values ensures that two different login sessions do not request a same sub-set of the client-side storage values.

6. The method of claim 1, wherein the protected resource comprises one or more of an application, web site or hardware device.

7. The method of claim 1, wherein the authentication information request further comprises a request for at least a portion of at least one password or other authentication credential associated with a user.

8. The method of claim 1, wherein the client-side storage values are substantially specific to the client device.

9. The method of claim 1, wherein one or more of the client-side storage values uniquely identify the client device.

10. The method of claim 1, further comprising the step of storing a bootstrap entry on the client device containing one or more client-side storage values as part of a first session by the client device.

11. The method of claim 1, further comprising the step of storing an entry on the client device containing one or more client-side storage values as part of a session by the client device.

12. A tangible machine-readable storage medium for controlling access of a client device to a protected resource for a current session, wherein the one or more software programs when executed by one or more processing devices implement the steps of the method of claim 1.

13. An apparatus for controlling access of a client device to a protected resource for a current session, the apparatus comprising:
   a memory; and
   at least one processor, coupled to the memory, operative to implement the following steps:
      issuing an authentication information request responsive to an access request from the client device to access the protected resource, wherein the authentication information request identifies a dynamic sub-set of cells storing client-side storage values previously stored on the client device during at least one prior session by one or more servers, wherein said dynamic sub-set of cells is identified by a plurality of cell identifiers that dynamically change for a plurality of said authentication information requests;
      receiving authentication information for said current session based on the dynamic sub-set of cells storing client-side storage values from the client device responsive to the authentication information request; and
      authenticating the client device for said current session based upon verification of the received authentication information.

14. The apparatus of claim 13, wherein the received authentication information from the client device is encrypted.

15. The apparatus of claim 13, wherein the client-side storage values are stored as a matrix having a plurality of records, wherein each record in the matrix is associated with a prior login session.

16. The apparatus of claim 15, wherein the dynamic sub-set of the cells storing client-side storage values comprises one or more cells from a plurality of the records.

17. The apparatus of claim 13, wherein the dynamic sub-set of the cells storing client-side storage values ensures that two different login sessions do not request a same sub-set of the client-side storage values.

18. The apparatus of claim 13, wherein the protected resource comprises one or more of an application, web site or hardware device.

19. The apparatus of claim 13, wherein the authentication information request further comprises a request for at least a portion of at least one password or other authentication credential associated with a user.

20. The apparatus of claim 13, wherein the client-side storage values are substantially specific to the client device.

21. The apparatus of claim 13, wherein one or more of the client-side storage values uniquely identify the client device.

22. The apparatus of claim 13, wherein the processor is further configured to store a bootstrap entry on the client device containing one or more client-side storage values as part of a first session by the client device.

23. The apparatus of claim 13, wherein the processor is further configured to store an entry on the client device containing one or more client-side storage values as part of a session by the client device.

* * * * *

UNITED STATES PATENT AND TRADEMARK OFFICE
CERTIFICATE OF CORRECTION

PATENT NO. : 8,875,244 B1  
APPLICATION NO. : 13/077076  
DATED : October 28, 2014  
INVENTOR(S) : Alex Vaystikh et al.

Page 1 of 1

It is certified that error appears in the above-identified patent and that said Letters Patent is hereby corrected as shown below:

Specification

Column 1, lines 47 and 48, replace "(eg., Man in The Middle MiTB)" with --(eg., Man in The Middle MiTM)--.

Column 4, line 26, replace "SecureID tokencode" with --SecureID® tokencode--.

Column 5, lines 29 and 30, replace "exemplary client-side storage client-side storage matrix 300" with --exemplary client-side storage matrix 300--.

Column 5, line 30, replace "stores a HTTP cookie" with --stores an HTTP cookie--.

Column 6, lines 37 and 38, replace "can directly requests authentication" with --can directly request authentication--.

Signed and Sealed this  
First Day of November, 2016

Michelle K. Lee  
*Director of the United States Patent and Trademark Office*